Aug. 29, 1950 E. W. HENRY 2,520,282
SPEED REDUCING POWER TRANSMISSION
Filed Aug. 8, 1947 4 Sheets-Sheet 3

INVENTOR:
ERWIN W. HENRY
BY
ATTORNEY

Patented Aug. 29, 1950

2,520,282

UNITED STATES PATENT OFFICE 2,520,282

SPEED REDUCING POWER TRANSMISSION

Erwin W. Henry, Cheyenne, Wyo.

Application August 8, 1947, Serial No. 767,449

4 Claims. (Cl. 74—804)

This invention relates to speed reducing power transmissions of epicyclic gear type and has as an object to provide an improved construction and interrelation of elements constituting such a transmission.

A further object of the invention is to provide an improved speed reducing power transmission characterized by a plurality of simultaneously or alternatively available, coaxial, differential speed, power output elements.

A further object of the invention is to provide an improved speed reducing power transmission characterized by multiple, differential speed, power output elements coaxial with the power input element.

A further object of the invention is to provide an improved speed reducing power transmission operable to simultaneously effect substantial speed reductions between a power input element and a plurality of coaxial, independently available, power output elements.

A further object of the invention is to provide an improved speed reducing power transmission effective to convert relatively high speed power input into two or more selectively available, differential, lower speed power outputs with practically negligible operative vibration and a minimum of power loss.

A further object of the invention is to provide an improved speed reducing power transmission that is effectively and continuously automatic in the conversion of relatively high speed power input into selectively available, differential, lower speed power outputs.

A further object of the invention is to provide an improved speed reducing power transmission adapted for efficient operative association with a driven member irrespective of the direction of driven member rotation.

A further object of the invention is to provide an improved speed reducing power transmission efficiently cooperable with a reversible driven member in either and both directions of driven member rotation.

A further object of the invention is to provide an improved speed reducing power transmission susceptible of direct connection to and in operative association with the driven shafts of various prime mover assemblies.

A further object of the invention is to provide an efficient and economical construction of cooperable elements constituting a speed reducing power transmission unit.

A further object of the invention is to provide a novel and improved internal gear construction adapted for simultaneous cooperation with a plurality of planet gears in a speed reducing transmission unit.

A further object of the invention is to provide a novel and improved combination of internal gear and comeshing planet gear tooth form particularly adapted for use in a speed reducing power transmission unit.

A further object of the invention is to provide improved diametrically balanced means effective to minimize operative vibration in a speed reducing power transmission unit of epicyclic gear type.

A further object of the invention is to provide an improved speed reducing power transmission susceptible of extension and modification in manufacture to provide a variable succession of progressively lower speed, coaxial, selectively available, simultaneously actuatable, power outputs in axially alined, driven relation with the transmission power input element.

A further object of the invention is to provide a speed reducing power transmission in the form of a compact unit assembly adaptable to a variety of specific installations and applications; to provide a construction for such a unit assembly that is susceptible of economical development through the exercise of established techniques and the use of known tools and facilities; and to give effect to novel and efficient operative principles in a practical and advantageous manner.

With the foregoing and other objects in view, my invention consists in the construction, arrangement, and combination of elements hereinafter set forth, pointed out in my claims, and illustrated by the accompanying drawings, in which—

In the construction of the illustrated embodiment of the invention, a gear case or unit housing is shown as a drum-like, interiorly-hollow assembly comprised from an axially-short, tubular casing member 15 identically open at its ends and closely similar end plates 16 and 17 opposed in closing relation with the opposite ends of the member 15. As a practical structural convenience, the member 15 ends are rabbeted to the form of annular shoulders adapted to mate with complementary angular shoulders peripherally of the end plates 16 and 17, so that cylindrical pins 18 engaged in parallelism with the member 15 axis through registered holes spaced uniformly and angularly about the plates 16 and 17 margins may function to clamp said plates to and in end-closing relation with said member through the agency of nuts 19 threadedly cooperating with the exterior ends of said pins. In the construction shown, the pins 18 function as certain of the teeth of an internal gear, for which reason said pins are spaced from and inwardly of the member 15 interior wall and are centered on a circle concentric with said member dimensioned to function as the pitch circle of the desired internal gear. For reasons that will hereinafter appear, it is expedient to interpose clamp rings 20 between the nuts 19 of the pins 18 and the end plates 16 and 17 surfaces otherwise engageable by said nuts, said clamp rings being annular members of suitable size formed with holes disposed to register with the pin-accommodating holes of said end plates. To stiffen the pin 18 portions spanning between the plates 16 and 17, and to correlate the angular disposition of the member 15 with that of said end plates, an annular rib 21 is formed on and projects radially and inwardly from the member 15 interior wall midportion and is intersected by holes disposed for registration with the pin-accommodating holes of the end plates and hence arranged to be traversed by the pins 18 when said member and the associated end plates are in suitable angular correlation. Hubs or bosses 22 are formed centrally on and to project exteriorly from the end plates 16 and 17 and are interiorly recessed to operatively accommodate anti-friction bearings 23 coaxial with the member 15, and circular apertures open through the end walls of the hubs or bosses 22 for the accommodation of power shaft elements rotatively supported by the bearings 23 axially of and extending at each end outwardly beyond the gear case assembly comprised from the elements heretofore described.

Rotatably supported adjacent one end by and engaging through the bearing 23 of the end plate 16, a shaft 24 is journaled axially of the gear case in a length sufficient to project at each end exteriorly of the plates 16 and 17, and the end of said shaft protruding through the plate 16 is suitably worked and equipped, as by means of an axial socket and associated keyway, for convenient connection to and in coaxial driven relation with the power shaft of a prime mover, such as an electric motor, engine, or the like. Just inwardly of the end plate 16, the diameter of the shaft 24 is reduced through an abrupt shoulder against which a double-lobed eccentric block 25 abuts in keyed telescopic relation with the shaft 24 lesser diametric portion. The block 25 is formed to provide axially-offset, fixedly-related, identical, circular cams of like and diametrically opposite eccentricity radially of the shaft 24, and a radial flange 26 preferably encircles and extends outwardly from the midlength of the block 25 to serve as a spacer effective to separate the elements operatively associated with the opposed cams of said block. Each cam of the block 25 carries and rotatably supports, preferably through the agency of an anti-friction bearing 27, one of a pair of like planet gears 28 and 29 thereby mounted on and for independent rotation about the respective cam and the shaft 24 in spaced parallelism on opposite sides of the spacer 26. The planet gears 28 and 29 are circular with respect to the centers of their supporting cams and are preferably toothed for meshing engagement and coaction with the fixed internal gear of the housing or case, said gears being hence so dimensioned and proportioned in relation to the eccentricity of their supporting cams as to tangentially register the planet gear pitch lines with the internal gear pitch line portions directly opposed to the respective gear supporting cam point of maximum eccentricity, and to operatively clear the planet gear tooth addendum circle from the internal gear on that side of the gear supporting cam opposite the point of maximum cam eccentricity. As above recited, the centers of the pins 18 define the pitch circle of the fixed internal gear, sections of said pins traversing the gear case in exposed relation between the end plates 16 and 17 and the rib 21 functioning as cylindrical teeth of a cage-type gear assembly. The internal gear could, of course, be completed through the provision of a succession of closely-spaced, parallel pins, in such number and circumferential spacing as would provide a gear of the specific character desired, but a preferred practice involves the use of a relatively limited number of pins 18, sufficient to perfect and maintain the case assembly, and to supply the additional teeth needed to complete the desired gear in the form of relatively shorter pins 18' spacedly paralleling the pins 18 and one another in journaled relation through registering holes intersecting the end plates 16 and 17 and the rib 21 in centered relation on the pitch line of the fixed gear; such a structural relation disposing the pins 18' for end confinement between the clamp rings 20, thereby inhibiting axial displacement of said pins, and facilitating a journaled mounting for said pins operatively effective to minimize frictions and wear. Obviously, the pins 18 and 18' comprising the teeth of the internal gear may all be either fixedly or rotatably supported in the gear case and, when desired, said pins may be of a size less than that desired for the gear teeth and may each support a rotatably associated wear sleeve along the length adapted to be engaged by the planet gears, to the end that frictions and wear may be accordingly minimized. The cylindrical form of the teeth comprising the internal gear points the necessity for a particular planet gear tooth outline, and such outline, together with the method of its generation, is hereinafter elaborated, but whatever may be the particular form and style of the planet and internal gear teeth, the operative principles of the invention will be given effect by the association with an internal gear of given tooth number of planet gears 28 and 29 having, identically, a tooth number less than that of the internal gear in some multiple of two chosen to accomplish the desired speed reduction or ratio in a given assembly.

In the illustrated embodiment of the invention, the internal gear has forty-four teeth and each of the planet gears 28 and 29 has forty-two teeth, so that, the end of the shaft 24 traversing the end plate 17 being operatively supported for rotation, each complete revolution of the shaft 24 rolls each of the planet gears in meshed relation with and completely about the internal gear with a consequent two-tooth drive of each planet gear rotationally of its supporting cam in a direction opposite to that of shaft 24 rotation, such angular displacement of the planet gears relative to the internal gear being naturally directionally the same for both planet gears, alike in amplitude as evidenced by both planet gears, and uniformly manifest as a fractional progressive displacement of the planet gears as the latter are caused to roll about the internal gear. Thus, in the arrangement shown and described, the planet gears are caused to complete one revolution for every twenty-one revolutions of the shaft 24 in an opposite direction.

Spacedly adjacent the planet gear 29 and on the side of the latter remote from the gear 28, a disc-like drive member 30 formed with an elongate, tubular hub 31 projecting axially from one of its faces is journaled coaxially with, on and for independent rotation about the shaft 24 with the end of its hub 31 remote from said member projected exteriorly of the gear case through and outwardly beyond the end plate 17. The member 30 is provided to reflect and operatively transmit through its hub 31 angular displacement of the gears 28 and 29 relative to the unit internal gear consequent upon rotation of the shaft 24, to which end said member 30 engages simultaneously with both of the planet gears in a manner to rotate therewith. Effecting the desired driving connection between the planet gears and the member 30, a plurality of pins 32, in this instance four in number, is fixedly disposed in uniform angular spacing on, at like distances radially from the center of, and to project parallel with the axis of the member 30 from the face of said member adjacent the gear 29, said pins 32 being of uniform length sufficient to extend through both gears 28 and 29 and preferably being each furnished with a wear sleeve 33 telescoped thereover and mounted on anti-friction bearings for rotation thereabout. To operatively accommodate the pins 32 and for driving coaction with the sleeves 33, or exterior surfaces, of said pins, the webs of the planet gears 28 and 29 are similarly intersected by a series of circular holes corresponding in number and angular spacing with said pins. The holes of both gear webs, being alike, are designated by the numerals 34, and the holes of each gear web are similarly disposed with their centers on a circle concentric with the associated gear and of a radius equal to the radial offset of the pins 32 on the member 30, and said holes 34 are of like diameters equal to the effective exterior diameter of a pin sleeve 33, or equivalent element, plus twice the maximum eccentricity of either throw or lobe of the cam block 25, so that, the gears 28 and 29 being meshed with the unit internal gear to register the centers of their holes 34 opposite the respective cam lobe points of maximum eccentricity on a common diameter of the assembly, the holes of the respective gears at all times partially register or overlap to define an open channel or passage adequate to receive or accommodate one of the member 30 pins in operatively effective bearing engagement of the hole 34 margins of the separate gears against opposite surface areas of the so-accommodated sleeve or pin. As so constructed and arranged, it is readily apparent that the assembly so far described functions in response to rotation of the shaft 24 to angularly displace the gears 28 and 29 relative to the unit internal gear in the proportion above set forth, and to simultaneously transmit such gear angular displacement by means of the sleeve equipped pins 32 through the member 30 and hub 31 in the form of a slow rotation of said hub about the shaft 24 exteriorly of the gear case.

Experience in the construction and assembly of practical units embodying the principles of the invention indicates that while the number of pins 32 effective to complete the drive between a given planet gear and associated member 30 may be varied and so proportioned to the pertinent torque load transmitted thereby, a unique relationship of practical significance appears to exist between the number of such pins and the number of internal gear teeth 18 and 18' in a given unit. Within the range of constructions thus far developed and operated, it is found that unit assembly is feasible and unit operation satisfactory only when the pins 32 of a given unit are in a number divisible without remainder into the number of internal gear teeth 18 and 18' present therein. Hence, as in the illustrated embodiment, an internal gear tooth number divisible without remainder by four requires for practical satisfaction the presence of four pins 32; an internal gear tooth number divisible without remainder by three would require the presence of three pins 32; an internal gear tooth number divisible without remainder by five would require the presence of five pins 32; and similarly throughout the normal range of the specified relationship.

The gear case or housing is preferably so designed as to accommodate the planet gears 28 and 29 for meshed operative engagement with the internal gear portion between the end plate 16 and rib 21 and to dispose the member 30 for rotation within the open central area defined by the rib inner margin, so that a circular cam 35, identical with one of the lobes of the cam block 25 in the illustrated embodiment, mounted on and fixed for rotation with the member 30 and hub 31 unit adjacent the member 30 face remote from the gears 28 and 29 may rotatively mount and support, through the agency of an antifriction bearing 27, a single planet gear 36, conveniently identical with the gears 28 and 29, for rolling engagement about and in meshed relation with the internal gear portion between the end plate 17 and rib 21 as said cam 35 rotates with the member 30 and hub 31 unit to which it is attached. The gear 36 is web-intersected by holes 34 in number and arrangement functionally identical with the corresponding elements of the gears 28 and 29, and a drive member 37 analogous to the member 30 is formed with a coaxial, tubular hub 38 adapted to telescopically receive and rotate on the hub 31 and is furnished with drive pins 39 fixedly outstanding in radially-offset, axial parallelism from the face of the member 37 remote from the hub 38 to accommodation within the holes 34 of the gear 36 for the transmission of gear 36 angular displacement about its cam 35 to effect rotation of the hub 38 about the hub 31 and shaft 24 in the same manner as the pins 32 operate to convert angular displacement of the gears 28 and 29 into rotation of the hub 31 about said shaft; the said pins 39 being desirably equipped with rotatably associated wear sleeves 33 in the manner and for the purpose shown and described with relation to the pins 32.

Completing the unit assembly for practical use, the hub 38 engages through and is supported for rotation by the bearing 23 of the end plate 17 hub or boss 22 and projects exteriorly of the case or housing a distance sufficient to operatively mount and drive a power take-off element, such as a pulley 40, while the hub 31 is journal supported for independent rotation within the hub 38 and about the shaft 24 to extend exteriorly of the case or housing beyond the outer end of the hub 38 for driving connection with a second power take-off element, such as a pulley 41, operatively separate from, coaxially adjacent, and characterized by a direction and speed of rotation different from that of the element 40, and the shaft 24 is journal supported for independent rotation within the hub 31 to extend exteriorly of the case or housing beyond the outer end of said hub 31 to there mount and drive a third power take-off element, such as a pulley 42, coaxial with and operatively separate from the elements 40 and 41, adjacent the latter element, having a speed of rotation different from that of either element 40 or 41, and a direction of rotation the same as that of the element 40 and opposite to that of the element 41. The speed reducing characteristics of the improved unit being made manifest through planet gear reactions to a fixed circumjacent internal gear, it is essential that the case or housing wherein the internal gear is comprised be secured against any tendency to rotate with the shaft 24 or others of the unit elements, to which end the casing member 15 and end plates 16 and 17, either or all, may be furnished with exterior extensions or projections, typified by the structure indicated at 43, adapted for fixed connection to and with related supporting or other immobilized structure to function as torque-resistant base or arm fixtures effective to anchor the case or housing and the associated internal gear and hold the unit against operation-nullifying displacement.

With the elements of the unit assembly constructed, assembled, and arranged as shown and described, the end of the shaft 24 projecting through the end plate 16 fixed coaxially to and in driven relation with the power shaft of a prime mover, and the gear case or housing anchored and held against angular displacement, the improvement is conditioned for practical transmission of power from the associated prime mover. As will be readily apparent, the shaft 24 of the unit assembly is rotatively driven as a consequence of associated prime mover actuation in the same direction and at the same speed as the prime mover power shaft, so that the power take-off 42 on the end of said shaft remote from the prime mover is available for the direct transmission of prime mover power output. As the shaft 24 is caused to rotate, the diametrically opposed lobes of the cam block 25 rotate therewith to uniformly and steadily roll their rotatively-associated planet gears 28 and 29 in constantly-meshed relation with and about the unit internal gear comprised by the pins 18 and 18', the diametric opposition of the like cam lobes and the consequent diametric opposition of the lobe-mounted gears 28 and 29 resulting in a condition of static and dynamic balance inhibitive of adverse operation vibrations, even when the speed of shaft 24 rotation is high. With a planet gear tooth number less than that of the internal gear, each revolution of the shaft 24 results in a planet gear angular displacement, identical for both gears 28 and 29, in a direction opposite to the shaft rotation, and such planet gear angular displacement is transmitted through the pins 32, member 30, and hub 31 to the power take-off element 41 where it is manifest as rotation of decreased speed and amplified torque in a direction opposite to shaft 24 rotation. Coincident with the differential speed driving of the hub 31 in the manner just described, the cam 35 is caused to rotate with the member 30 and hub 31 to slowly and steadily roll its rotatively-associated gear 36 in meshed relation with and about the unit internal gear for a consequent angular displacement of said gear 36, due to the lesser number of its teeth, relative to the internal gear and in a direction opposite to that of cam 35 rotation. At the very much reduced speed of cam 35 rotation, any centrifugal forces deriving from the unbalance of said cam and its gear 36 are insignificant and require no compensation, but should the second stage of speed reduction represented by the gear 36 be utilized in an assembly to which the power input is at abnormally high speed, it is entirely feasible to duplicate the driving cam and given gear in balanced, diametric opposition in the same manner as is described with respect to the first stage of speed reduction. Angular displacement of the gear 36 incident to hub 31 and cam 35 rotation is transmitted through the pins 39, member 37, and hub 38 to the power take-off element 40 where it is manifest as a relatively very slow, correspondingly very high torque, steady rotation of said element 40 in a direction the same as that of element 42 rotation, thereby completing a series of simultaneously-operating, selectively-available, closely-adjacent, coaxial power take-offs or outputs coaxial with and on the side of the unit assembly remote from the power input.

Obviously, the unit assembly may be extended or modified at the time of its manufacture to accomplish a succession of simultaneous speed reductions in such number and differential speed proportions as may be desired for particular purposes, one of the outputs or power take-offs of each such embodiment having speed and torque characteristics identical with the associated prime mover. Representative of the relationships obtainable through units of the type shown and described, a forty-four tooth internal gear reacting with forty-two tooth planet gears in a two-stage reduction is productive of a first stage speed reduction of twenty-one to one, a second stage reduction of twenty-one to one with respect to the first stage output, and consequently a second stage reduction of four hundred and forty-one to one with respect to the input speed. Thus, given a prime mover power shaft speed of 1750 R. P. M., the first stage reduction of the unit would be manifest as a speed of 83⅓ R. P. M. in the take-off element 41 and the second stage speed reduction of the unit would be manifest as a rotational speed of just slightly less than 4 R. P. M. in the take-off element 42. Through variations in the tooth numbers of the internal gear and planet gears within the structural and operative limits peculiar to the structure of the unit, a range of speed differentials characterizing the power outputs of the unit may be developed to meet an almost infinite number of particular operative requirements with reference to the known power shaft speed of a selected prime mover.

A novel characteristic of the improved unit being the use of a spaced, parallel succession of cylindrical elements centered on a circle to constitute the teeth of a cage-type gear whereof said circle is the pitch line and wherewith the external teeth of eccentrically-related, interiorly-disposed, spur gears of lesser diameter are intended to mesh, a particular spur gear tooth form or outline is required to effect the desired coaction in each selected combination of gear tooth numbers, pitch, consequent diameters and cage gear tooth size, hence a characteristic spur gear tooth form and a reliable method applicable to generate the specific outline pertinent to a given set of conditions are material to a comprehensive disclosure of the invention. To be operatively and satisfactorily effective, the teeth of the planet or spur gears must have an outline form smoothly coactable with the cylindrical tooth elements of the cage gear, without wedging or binding effect, in every relation of a given spur gear tooth with the successive cage gear teeth resulting from rolling of the eccentrically-mounted spur gear in meshed engagement about and within the cage gear, which requirement gives merit to a spur gear tooth outline determination in the manner and through application of the method exemplified by Figures 9 and 10.

Figure 1:
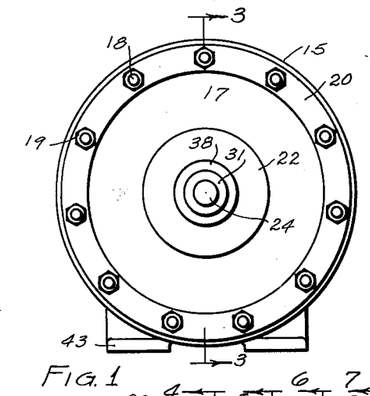
Figure 1 is an end elevation of a typical speed reducing power transmission unit embodying the principles of the invention.
Figure 2:
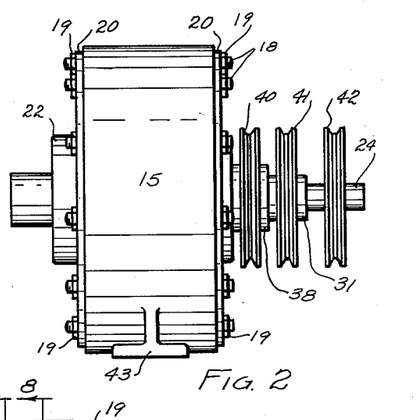
Figure 2 is a side elevation of the unit shown in Figure 1.
Figure 3:
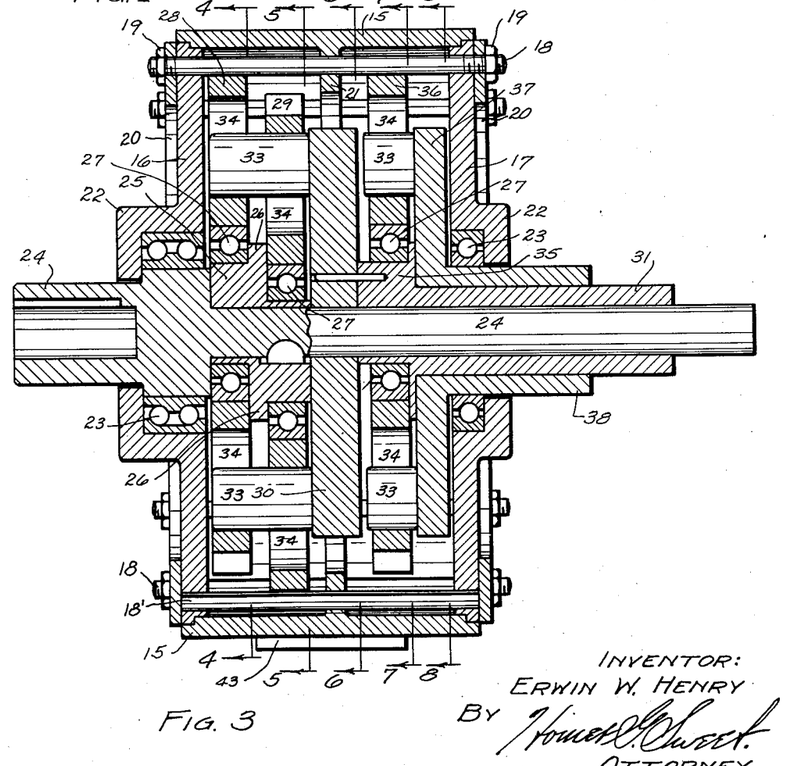
Figure 3 is a cross section, on an enlarged scale, taken substantially on the indicated line 3—3 of Figure 1.
Figures 4, 5, 6:
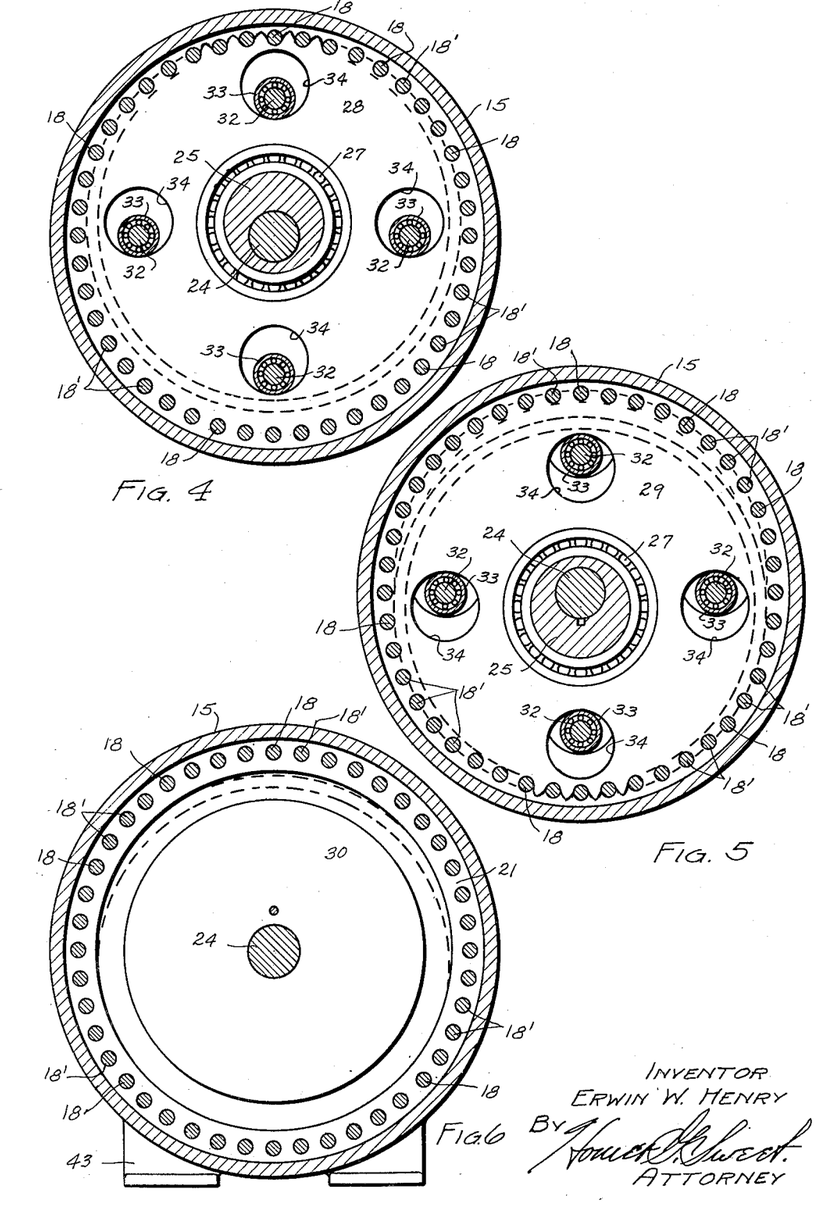
Figure 4 is a cross section, on a scale somewhat reduced relative to Figure 3, taken substantially on the indicated line 4—4 of said latter view.
Figure 5 is a cross section, on the same scale as Figure 4, taken substantially on the indicated line 5—5 of Figure 3.
Figure 6 is a cross section, on the same scale as Figure 4, taken substantially on the indicated line 6—6 of Figure 3.
Figure 7:
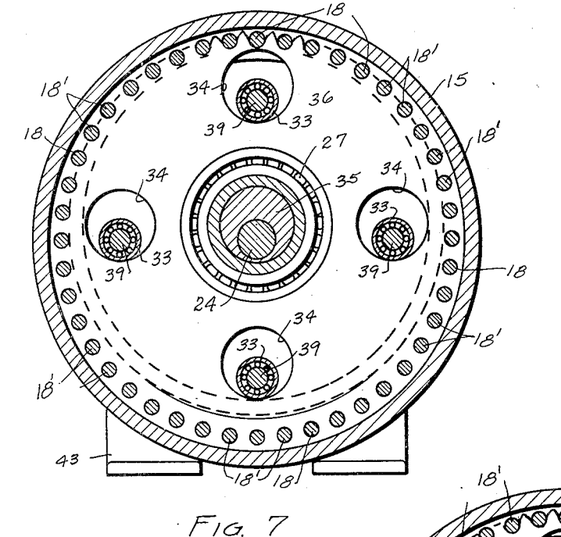
Figure 7 is a cross section, on the same scale as Figure 4, taken substantially on the indicated line 7—7 of Figure 3.
Figure 8:
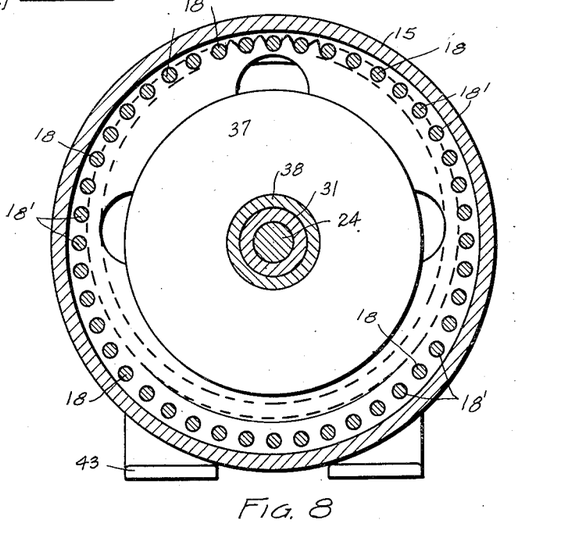
Figure 8 is a cross section, on the same scale as Figure 4, taken substantially on the indicated line 8—8 of Figure 3.
Figures 9, 10:
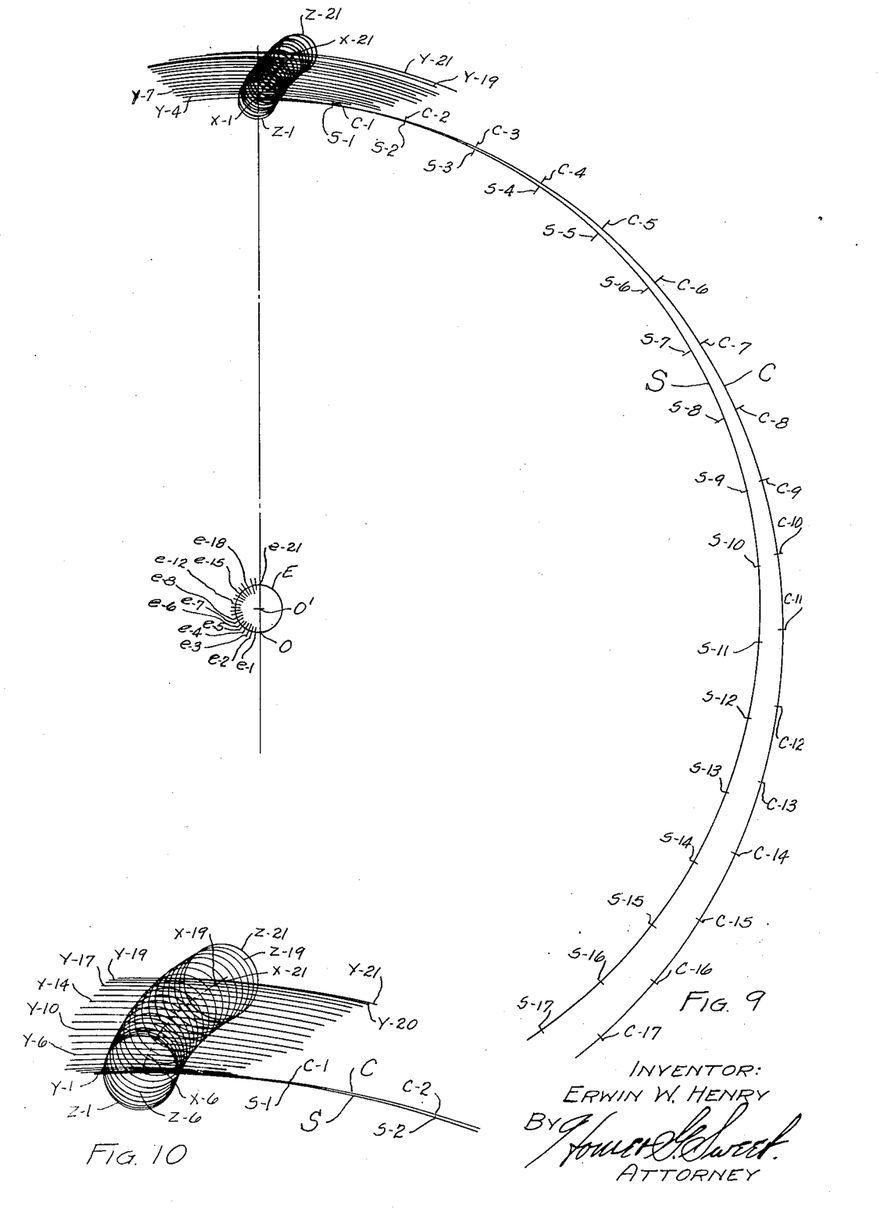
Figure 9 is a partial diagram of coacting internal and planet gear elements and relationships significant to and illustrating the method of planet gear tooth form or outline generation.
Figure 10 is an enlarged, detail reproduction of the half-tooth outline development typical of tooth generation according to the disclosure of the preceding figure.

Each spur and cage gear combination of the type employed in the improved unit is characterized by certain predetermined or assumed dimensional data pertinent to determination of an appropriate spur gear tooth outline for the combination. Such data will include the tooth pitch or spacing, alike for both gears, and the number of teeth for each gear, which factors control and determine the respective gear pitch circle diameters and the eccentricity of spur gear mounting, as well as the cage gear cylindrical tooth diameter. With these data, assumed as hereinafter specified, the appropriate spur gear tooth outline may be conveniently and precisely developed through correlation of the successive cage gear tooth positions with a single spur gear tooth zone as represented by the diagrams of Figures 9 and 10 and hereinbelow explained.

In the diagrams, it is assumed that the cage gear teeth are cylinders of three-eights inch diameter, that the cage gear has forty-four teeth and the spur gear forty-two teeth, and that the tooth pitch is three-quarters of an inch, from which assumptions it follows that the cage gear will have a pitch circle diameter of ten and one-half inches, very nearly, the spur gear a pitch circle diameter of ten and one-fortieth inches, approximately, and that the radius of eccentricity of the spur gear mounting relative to the cage gear, being one-half the difference between the pitch circle diameters, will approximate nineteen-eightieths of an inch. These data are translated into a scale diagram by scribing an arc C of proper radius about a center O to represent the cage gear pitch circle, scribing a second arc S, either separate from or internally tangent to the arc C, of proper radius about a center O' to represent the spur gear pitch circle, demarking and successively identifying pitch distances from a common point along each of the arcs C and S, as indicated by the designations $c-1$ and $s-1$, et sequentia, and scribing a circle E about the center O' with a radius equal to one-half the difference between the pitch circle diameters. From the successive pitch distance points $s-1$, et seq., of the arc S, radii are extended through the center O' to intersect the remote side of the circle E to mark, by such intersection, spaced points $e-1$, et seq., constituting a succession of centers for subsequent use. With a compass set to the radius of the arc C and progressively and successively centered in the points $e-1$, et seq., of the circle E, non-uniformly spaced arcs $y-1$, et seq., are scribed exteriorly of and across the zone of the arc S between the origin point of pitch distance demarcation and the point $s-1$, and a point $x$ is then located on each of the arcs $y$ to serve as a center for the scribing of a circle $z$ representing a cage tooth circumference. For the location of the points $x$ on the respective arcs $y$, the successively designated pitch distance points of both arcs C and S are utilized. With compass or dividers, the straight line length from the origin point of pitch distance demarcation on the arc C is measured to any given pitch distance point on said arc and the length so determined is then used as a radius centered at one end on the arc S pitch distance point corresponding in number to the arc C point to which the length was measured and is swung about such center to intersection at its other end with the $y$ arc of number corresponding with the center point employed, thereby establishing the desired point $x$ on the particular arc $y$. Through repetitious application of the procedure just outlined, points $x$ are located on the arcs $y$ to represent the centers of the cage gear teeth as successively related to the same spur gear tooth position in simulation of the relationships resulting from rotation of the spur gear center about the cage gear center to roll the spur gear in meshed engagement with and interiorly about the cage gear, so that when the circles $z$ are struck from and about the respective points $x$, a line smoothly joining and successively tangent to the arcs of said circles adjacent the pitch distance point $s-1$ and embraced between the arc S radii to the point of pitch distance demarcation origin and the midpoint of the first pitch distance length determines the half-outline of a spur gear tooth suited to effect the coaction desired.

From the foregoing it is readily apparent that the improvement is susceptible of manufacture and development as a compact unit susceptible of operative association with, attachment to, or structurally-integrated combination with prime movers of various types and designs to provide convenient, coaxially-grouped power take-offs of differential speed and torque characteristics separately or simultaneously available to drive apparatus and mechanisms, or differential speed elements thereof, of an infinite variety of constructions and purposes. The improvement is particularly adapted for mounted association on and in direct driven relation with the power shaft of an electric motor for differential speed power output in alinement with the power shaft axis and in anchored relation of the unit case or housing with the motor structure, thereby effectively converting the motor to multi-speed driving purposes with a minimum of installation problems and with advantageous adaptability of the resulting power combination. The balancing of the higher speed reduction stage or stages of the improved unit accomplished as hereinabove set forth precludes the development of destruction and disadvantageous vibrations incident to unit operation and contributes to the efficiency, long life, and smooth operation of the unit at low noise level, and the novel gear tooth combination characteristic of the improvement is material to economy of unit manufacture and efficiency of unit operation.

Since many changes, variations, and modifications in the specific form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. A speed reducing power transmission comprising a fixedly-mountable housing assembly enclosing a fixedly-related, axially-elongate, internal gear, a driven shaft connectible with and for rotation by a source of power journaled in and axially traversing said assembly concentrically of said gear, a sleeve hub telescopically coaxial with and rotatable about said shaft through the assembly wall remote from the shaft power input end, planet gear means eccentrically journaled on said shaft in constant-meshed relation with said internal gear, driving connections between said planet gear means and hub effective to manifest angular displacement of the former as corresponding rotation of the latter, a second sleeve hub telescopically coaxial with and rotatable about said first hub through the assembly wall, planet gear means eccentrically journaled on said first sleeve hub in constant-meshed relation with said internal gear, driving connections between said latter planet gear means and second hub effective to manifest angular displacement of the associated planet gear means as corresponding rotation of said second hub, a simultaneously-available power take-off means on the adjacent coaxial ends of said shaft and hubs, wherein said housing assembly is comprised from an open-end tubular member and centrally-apertured, circular plates clamped to and in closing relation across the member ends by means of bolts engaging through said plates in inwardly-spaced parallelism with the member inner cylindrical wall to constitute teeth of said internal gear, and is equipped with means for anchoring the unit against rotation about its axis.

2. A speed reducing power transmission comprising a fixedly-mountable housing assembly enclosing a fixedly-related, axially-elongated, internal gear, a driven shaft connectible with and for rotation by a source of power journaled in and axially traversing said assembly concentrically of said gear, a sleeve hub telescopically coaxial with and rotatable about said shaft through the assembly wall remote from the shaft power input end, planet gear means eccentrically journaled on said shaft in constant-meshed relation with said internal gear, driving connections between said planet gear means and hub effective to manifest angular displacement of the former as corresponding rotation of the latter, a second sleeve hub telescopically coaxial with and rotatable about said first hub through the assembly wall, planet gear means eccentrically journaled on said first sleeve hub in constant-meshed relation with said internal gear, driving connections between said latter planet gear means and second hub effective to manifest angular displacement of the associated planet gear means as corresponding rotation of said second hub, a simultaneously-available power take-off means on the adjacent coaxial ends of said shaft and hubs, wherein said housing assembly is a cylindrical unit anchorable against rotation about its axis, and said internal gear is comprised from a succession of like cylindrical elements uniformly spaced apare angularly about, at like distances radially from, and parallel to the axis of the assembly to traverse the full length of the latter in inwardly-spaced adjacency to the assembly inner-cylindrical wall.

3. A speed reducing power transmission comprising a fixedly-mountable housing assembly enclosing a fixedly-related, axially-elongated, internal gear, a driven shaft connectible with and for rotation by a source of power journaled in and axially traversing said assembly concentrically of said gear, a sleeve hub telescopically coaxial with an rotatable about said shaft through the assembly wall remote from the shaft power input end, planet gear means eccentrically journaled on said shaft in constant-meshed relation with said internal gear, driving connections between said planet gear means and hub effective to manifest angular displacement of the former as corresponding rotation of the latter, a second sleeve hub telescopically coaxial with and rotatable about said first hub through the assembly wall, planet gear means eccentrically journaled on said first sleeve hub in constant-meshed relation with said internal gear, driving connections between said latter planet gear means and second hub effective to manifest angular displacement of the associated planet gear means as corresponding rotation of said second hub, a simultaneously-available power take-off means on the adjacent coaxial ends of said shaft and hubs, wherein said internal gear is a cage of uniformly spaced parallel, cylindrical, tooth elements concentrically about the driven shaft in fixed relation within and to bridge between opposite ends of the housing assembly, and the planet gear means comprises, in each instance, at least one spur gear toothed in a number less than that of the internal gear to roll in meshing co-action interiorly of the latter about a circular cam eccentrically fixed to a driving element concentric with the internal gear.

4. A speed reducing power transmission comprising a fixedly-mountable housing assembly enclosing a fixedly-related, axially-elongated, internal gear, a driven shaft connectible with and for rotation by a source of power journaled in and axially traversing said assembly concentrically of said gear, a sleeve hub telescopically coaxial with and rotatable about said shaft through the assembly wall remote from the shaft power input end, planet gear means eccentrically journaled on said shaft in constant-meshed relation with said internal gear, driving connections between said planet gear means and hub effective to manifest angular displacement of the former as corresponding rotation of the latter, a second sleeve hub telescopically coaxial with and rotatable about said first hub through the assembly wall, planet gear means eccentrically journaled on said first sleeve hub in constant-meshed relation with said internal gear, driving connections between said latter planet gear means and second hub effective to manifest angular displacement of the associated planet gear means as corresponding rotation of said second hub, a simultaneously-available power take-off means on the adjacent coaxial ends of said shaft and hubs, wherein the planet gear means of higher speed reduction stages comprises a pair of identical spur gears toothed in a number less than that of the internal gear to roll in simultaneous, diametrically-opposed, meshing coaction interiorly of the latter and in closely-spaced, parallel adjacency about like, diametrically- opposed, circular cams, eccentrically fixed in parallel adjacency to a driving element concentric with the internal gear, and the driving connections between said planet gear means and correspondingly-rotatable sleeve hub correspondingly and simultaneously engage both said spur gears.

ERWIN W. HENRY.

REFERENCES CITED

The following references are of record in the file of this patent:

UNITED STATES PATENTS

| Number | Name | Date |
|---|---|---|
| Re. 17,811 | Braren | Sept. 23, 1930 |
| 2,170,951 | Perry | Aug. 29, 1939 |
| 2,303,365 | Karlsen | Dec. 1, 1942 |
| 2,382,482 | Henry | Aug. 14, 1945 |

FOREIGN PATENTS

| Number | Country | Date |
|---|---|---|
| 361,015 | Great Britain | Nov. 19, 1931 |